United States Patent
Tsukagoshi

(10) Patent No.: US 8,760,579 B2
(45) Date of Patent: Jun. 24, 2014

(54) VIDEO DISPLAY APPARATUS, VIDEO DISPLAY SYSTEM AND VIDEO DISPLAY METHOD

(75) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 815 days.

(21) Appl. No.: 12/583,414

(22) Filed: Aug. 20, 2009

(65) Prior Publication Data

US 2010/0053443 A1    Mar. 4, 2010

(30) Foreign Application Priority Data

Aug. 29, 2008  (JP) ............................... P2008-221857

(51) Int. Cl.
*H04N 9/74*     (2006.01)
*H04N 5/44*     (2011.01)
*H04N 5/445*    (2011.01)

(52) U.S. Cl.
USPC ............ 348/584; 348/561; 348/563; 348/564

(58) Field of Classification Search
None
See application file for complete search history.

(56) References Cited

U.S. PATENT DOCUMENTS

| | | | |
|---|---|---|---|
| 5,517,588 A * | 5/1996 | Kondo | 382/300 |
| 6,493,036 B1 * | 12/2002 | Fernandez | 348/561 |
| 2002/0056136 A1 * | 5/2002 | Wistendahl et al. | 725/135 |
| 2003/0132948 A1 * | 7/2003 | Bhogal et al. | 345/660 |
| 2004/0223058 A1 | 11/2004 | Richter et al. | |
| 2005/0151885 A1 | 7/2005 | Choi | |
| 2007/0162611 A1 * | 7/2007 | Yu et al. | 709/232 |
| 2008/0074444 A1 | 3/2008 | Morikawa et al. | |

FOREIGN PATENT DOCUMENTS

| | | |
|---|---|---|
| JP | 2002290930 A | 10/2002 |
| JP | 2005316007 A | 11/2005 |
| JP | 2008005428 A | 1/2008 |
| JP | 2008-085461 A | 4/2008 |

OTHER PUBLICATIONS

European Search Report EP 09168801, dated Sep. 16, 2010.
Office Action from Japanese Application No. 2008-221857, dated Jun. 22, 2010.

* cited by examiner

*Primary Examiner* — Jefferey Harold
*Assistant Examiner* — Michael Teitelbaum
(74) *Attorney, Agent, or Firm* — Lerner, David, Littenberg, Krumholz & Mentlik, LLP

(57) ABSTRACT

A video display apparatus includes a tuner unit that receives a video signal from a broadcasting station, a first video region cutout unit that cuts out video of a predetermined region set in advance from video received by the tuner unit as a window A and performs scaling processing on the video of the window A, a second video region cutout unit that cuts out video of a predetermined region containing an object specified by a user from the received video, a composition processing unit that generates video data by superimposing the video of the window B on that of the window A on which the scaling processing is performed, and at least one monitor that displays the video data generated by the composition processing unit.

7 Claims, 9 Drawing Sheets

FIG. 9
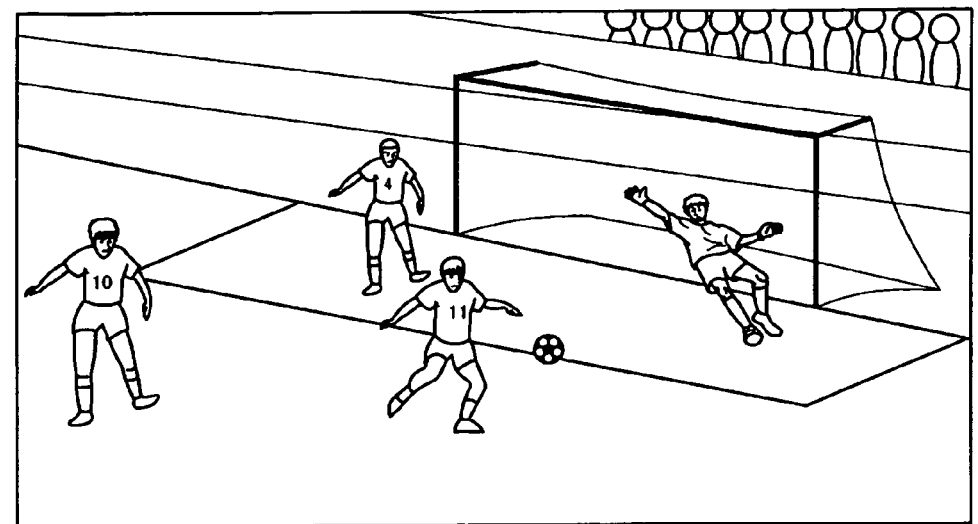
8k × 4k RECEIVED VIDEO
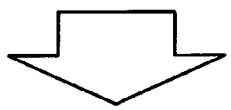
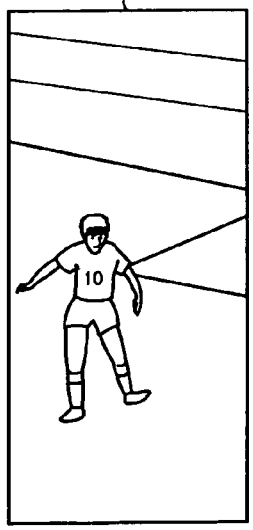
FIRST WINDOW A
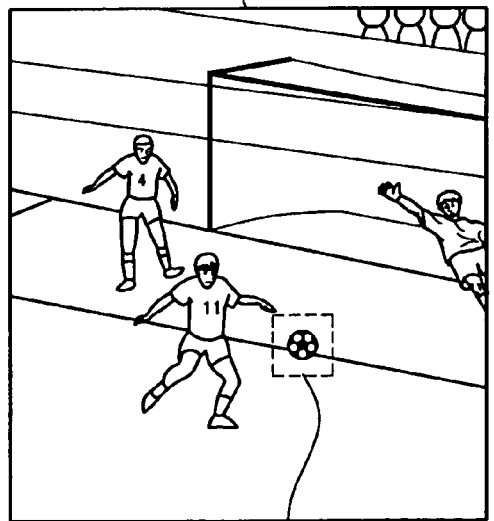
SECOND WINDOW A
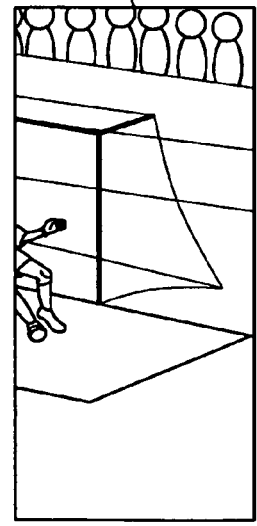
THIRD WINDOW A
SECOND WINDOW B
MONITOR A      MONITOR B      MONITOR C

VIDEO DISPLAY APPARATUS, VIDEO DISPLAY SYSTEM AND VIDEO DISPLAY METHOD

CROSS-REFERENCE TO RELATED APPLICATION

The present application claims priority from Japanese Patent Application No. JP 2008-221857 filed in the Japanese Patent Office on Aug. 29, 2008, the entire content of which is incorporated herein by reference.

BACKGROUND OF THE INVENTION

1. Field of the Invention

The present invention relates to a video display apparatus, a video display system, and a video display method.

2. Description of the Related Art

The valid pixel numbers standardized for current digital broadcasting are 1920×1080, the so-called high definition (HD) standard. However, technologies to broadcast high-definition content having greater pixel numbers exceeding those of this standard are being researched. Such technologies include a technology called the super high definition (SHD) whose research and development is conducted by the Japan Broadcasting Corporation (registered trademark). Maximum numbers of pixels of SHD under development are 7680 (horizontal)×4320 (vertical), which considerably exceed those of the HD standard.

When SHD technology is established in the future, a transition to a video standard such as SHD that provides higher quality exceeding HD and a high sense of realism can be expected in the future. Such a transition is expected to be accompanied by higher-resolution video display apparatuses with an increasingly larger screen. In a period of transition of a video standard, however, it is expected that video content based on SHD will exist together with that of HD in the past and also SHD compatible video display apparatuses will exist together with video display apparatuses supporting HD in the past.

Under such circumstances, a problem that viewers have an uncomfortable feeling due to a change in resolution arises if, for example, a video signal of lower resolution (HD) is input into an SHD compatible display apparatus or a video signal of higher resolution (SHD) is input into an HD compatible display apparatus. To cope with such circumstances, for example, Japanese Patent Application Laid-Open (JP-A) No. 2008-85461 discloses a technology of scaling to an appropriate display size when lower resolution video is input into a higher resolution display apparatus compatible with SHD.

SUMMARY OF THE INVENTION

However, the technology described in JP-A No. 2008-85461 is to scale video content to an appropriate display size when video content of lower resolution is received by a display apparatus capable of displaying video content of higher resolution. Therefore, for example, if a video signal of higher resolution compatible with the new SHD standard is input into a display apparatus compatible with the HD standard in the past, there arises a problem that it is difficult to display video by maintaining SHD quality. Further, since there are generally more users who have no display apparatus compatible with a new standard in a transition period of a video standard, a technology capable of dealing with such a problem is desired.

The present invention has been made in view of the above problem and it is desirable to provide a novel and improved video display apparatus capable of maintaining and displaying video quality of higher resolution even if a video signal of resolution higher than that compatible with a monitor is received, a video display system, and a video display method.

According to an embodiment of the present invention, there is provided a video display apparatus, including: a tuner unit that receives a video signal from a broadcasting station; a first video region cutout unit that cuts out video of a predetermined region set in advance from video received by the tuner unit as a window A and performs scaling processing on the video of the cutout window A; a second video region cutout unit that cuts out video of a predetermined region containing an object specified by a user from the video received by the tuner unit as a window B; a composition processing unit that generates video data by superimposing the video of the window B on that of the window A on which the scaling processing is performed; and at least one monitor that displays the video data generated by the composition processing unit.

According to the above configuration, among video signals received from a broadcasting station, a video display apparatus may cut out video of a preset region as a window A. The video display apparatus may perform scaling processing on the video of the window A. Also, among video signals received from the broadcasting station, the video display apparatus may cut out video of a predetermined region containing an object specified by a user as a window B. The video display apparatus may generate composite video data by superimposing the video of the window B on that of the window A on which the scaling processing is performed. Further, the video display apparatus may cause at least one monitor to display the video data generated in this manner.

The second video region cutout unit can add a position of the window B with respect to a video region of the window A to the video data of the window B as vector information.

Also, the composition processing unit can generate the video data by superimposing the video of the window B on that of the window A on which the scaling processing is performed by determining the position of the window B with respect in the video region of the window A based on the vector information added to the video data of the window B.

Further, the first video region cutout unit can perform the scaling processing on the video of the window A based on resolution that the monitor can display.

If the resolution of the window A is larger than that the monitor can display, the first video region cutout unit can scale down the video of the window A in accordance with the resolution that can be displayed by the monitor. If the resolution of the window A is smaller than that the monitor can display, the first video region cutout unit can scale up the video of the window A in accordance with the resolution that can be displayed by the monitor.

If a plurality of the monitors is provided, the first video region cutout unit can cut out video of a predetermined region preset for each monitor from the video received by the tuner unit as a window A and may perform the scaling processing on the cutout video of each window A based on the resolution that can be displayed by each monitor. In this case, the second video region cutout unit can cut out the video of the predetermined region containing the object specified by the user from the video received by the tuner unit as the window B. The composition processing unit can generate one piece of video data based on the video data of the windows A and B for each of the plurality of monitors. Further, the plurality of monitors can display each piece of the video data generated by the composition processing unit.

Furthermore, according to another embodiment of the present invention, there is provided a video display system including a video display apparatus that includes a service system, a client system, a large-screen system, and a monitor. Here, the service system may include a tuner unit that receives a video signal from a broadcasting station, a first video region cutout unit that cuts out video of a predetermined region set in advance from video received by the tuner unit as a window A and performs scaling processing on the video of the cutout window A, and a second video region cutout unit that cuts out video of a predetermined region containing an object specified by a user from the video received by the tuner unit as a window B. The client system may manage video data of the windows A and B cut out by the service system by synchronizing the video data. The large-screen system may include a composition processing unit that acquires the video data of the windows A and B managed by the client system in synchronization and generates video data by superimposing the video of the window B on that of the window A on which scaling processing is performed. The video display apparatus may have a monitor that displays the video data synthesized by the large-screen system.

Furthermore, according to another embodiment of the present invention, there is provided a video display method, including the steps of: receiving a video signal from a broadcasting station; cutting out a window A by cutting out video of a predetermined region set in advance from video received in the receiving step as the window A; performing scaling processing on the video of the cutout window A cut out in the step of cutting out the window A; cutting out a window B by cutting out video of a predetermined region containing an object specified by a user from the video received in the receiving step as the window B; composition processing of generating video data by superimposing the video of the window B on that of the window A on which the scaling processing is performed; and causing at least one monitor to display the video data generated in the composition processing step.

According to the embodiments of the present invention described above, a novel and improved video display apparatus capable of maintaining and displaying video quality of higher resolution even if a video signal of resolution higher than that compatible with a monitor is received, a video display system, and a video display method are provided.

BRIEF DESCRIPTION OF THE DRAWINGS

FIG. 9 is an explanatory view exemplifying video displayed in three monitors A, B, and C in the modification of the embodiment.

DETAILED DESCRIPTION OF THE PREFERRED EMBODIMENTS

Figure 1:
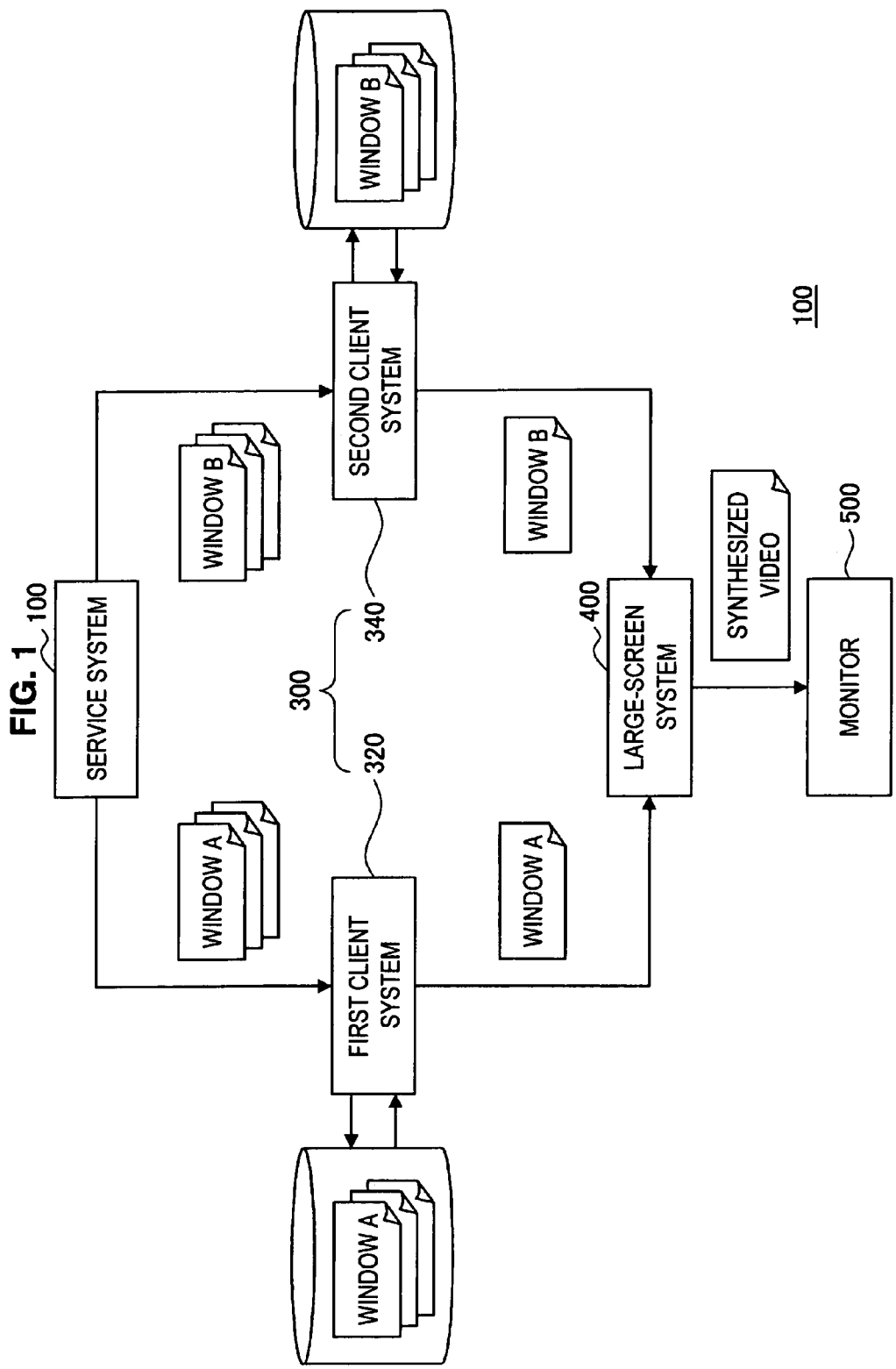
FIG. 1 is an explanatory view exemplifying an overall configuration of a video display system 100 according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

The description will be provided in the order shown below:
1. Overview of an embodiment
2. Overall configuration of the video display system 100
3. Function configuration of the service system 200
4. Function configuration of the client system 300
5. Function configuration of the large-screen system 400
6. Display example of the monitor 500
7. Modification (example in which a plurality of monitors is provided)

(1. Overview of an Embodiment)

Before describing details of an embodiment, an overview of the embodiment will be provided. The video display system 100 according to an embodiment of the present invention is a system that makes it possible, when a video signal of resolution higher than that compatible with a video display apparatus including a display unit such as a monitor is received, to maintain and display video quality of higher resolution. If, for example, the video display apparatus is a display apparatus compatible with the HD standard, the video display apparatus is normally capable of displaying video of resolution of 1920 (horizontal)×1080 (vertical) (hereinafter, referred to as "2 k×1 k"). If a video signal having resolution of, for example, 7680 (horizontal)×4320 (vertical) (hereinafter, referred to as "8 k×4 k") compatible with SHD is sent to such a video display apparatus, the video signal can be displayed by maintaining video quality of 8 k×4 k as much as possible by using a video display system according to the present embodiment.

More specifically, the service system 200 included in the video display system 100 cuts out a first video region (hereinafter, referred to as the "window A"), which is a preset arbitrary region, from a received 8 k×4 k video signal. Further, the service system 200 cuts out a second video region (hereinafter, referred to as the "window B"), which is an arbitrary region containing a specific object specified by the user, from the received 8 k×4 k video signal. Then, the service system 200 performs scaling processing on video data of the window A based on resolution compatible with the monitor 500 held by the video display apparatus. The service system 200 also adds a relative position of the window B in the video region of the window A as vector information to video data of the window B.

Video data of the windows A and B cut out in this manner is transmitted to the client system 300 included in the video display system 100. Then, the client system 300 synchronizes accumulated video data of each window and transmits the synchronized video data to the large-screen system 400 included in the video display system 100. Based on the above vector information, the large-screen system 400 determines the position of the window B in the window A and generates one piece of video data by superimposing video data of the window B on that of the window A. Then, the composite video data is transformed into a data format that can be displayed in the monitor 500 provided with the video display apparatus, and then displayed in the monitor 500.

Therefore, video of the window A on which scaling processing is performed will be displayed in the monitor 500 with video of the window B in a state in which received video quality is maintained being superimposed thereon. Accordingly, the monitor 500 can display an arbitrary region containing a specific object specified by the user in a state in which high-resolution video quality is maintained. Details of the video display system 100 having the above features will be described below.

(2. Overall Configuration of the Video Display System 100)

First, an example of the overall configuration of the video display system 100 according to an embodiment of the present invention will be described with reference to FIG. 1. FIG. 1 is an explanatory view exemplifying the overall configuration of the video display system 100 according to an embodiment of the present invention.

As shown in FIG. 1, the video display system 100 includes the service system 200, the client system 300, the large-screen system 400, and the monitor 500. In the video display system 100 shown in FIG. 1, each system is configured individually and independently and connected via a network, but the present invention is not limited to such a configuration. For example, the video display apparatus including the monitor 500 may naturally include all of the functions of each system shown in FIG. 1. That is, each system will be described as being individual and independent in the description of the embodiment below. However, a video display apparatus such as a TV set can also have similar features by being equipped with functions of each system. Details of the functions of each system will be described below.

(3. Function Configuration of the Service System 200)

Figure 2:
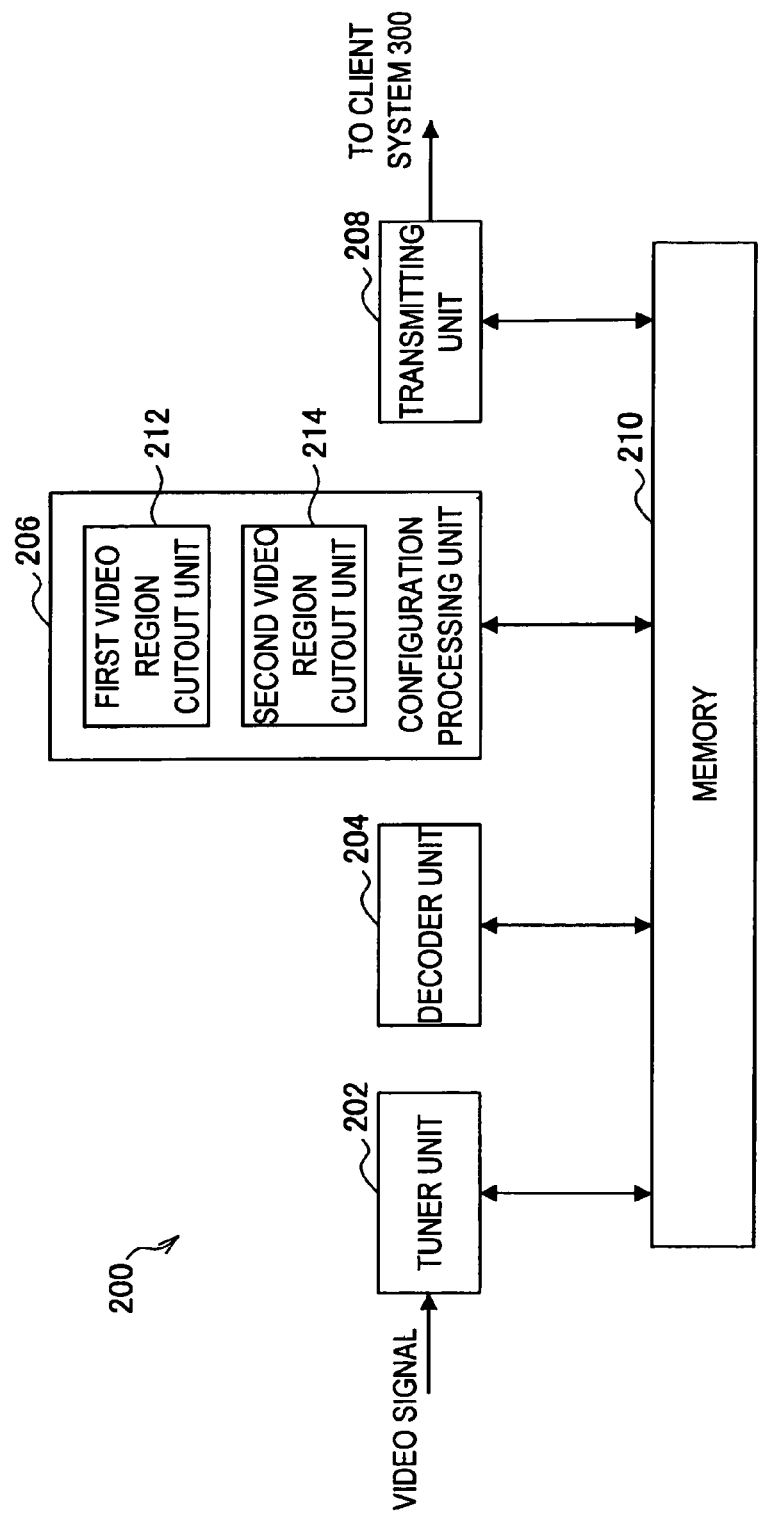
FIG. 2 is an explanatory view exemplifying a function configuration of a service system 200 in the embodiment.

FIG. 2 is an explanatory view showing the function configuration of the service system 200. As shown in FIG. 2, the service system 200 mainly includes a tuner unit 202, a decoder unit 204, a configuration processing unit 206, and a transmission unit 208. A memory 210 is a region to temporarily store data or a signal processed by these constituent units. These constituent units are linked by a bus or the like and integrally controlled by a CPU (not shown). Details of the function configuration of the service system 200 will be described below.

(Tuner Unit 202)

The tuner unit 202 receives video data from a broadcasting station via an antenna (not shown). As described above, video data includes video data of various kinds of resolution such as SHD video data of 8 k×4 k and HD video data of 2 k×1 k. Video data also includes system information showing content of services being broadcast or events. The tuner unit 202 can extract a frequency signal of the channel specified by the user from a received broadcast wave. A broadcasting station generally generates fragmentary packets from data such as video, sound, and program information and multiplexes these packets into a transport stream (hereinafter, referred to as TS), which is sent out as a broadcast wave. Therefore, the tuner unit 202 functions as a receiving unit of TS, which is a broadcast wave sent out from a broadcasting station. TS received by the tuner unit 202 is transmitted to each constituent unit of the service system 200 including the memory 210, which is a temporary storage region.

(Decoder Unit 204)

The decoder unit 204 performs demultiplexer processing on all TSs of video data received by the tuner unit 202. For example, the decoder unit 204 interprets Packet ID (PID) attached to the header of packets of TS to separate the input TS into sound data, video data, and system information. Then, for example, separated video data is subjected to predetermined decode processing to generate a video signal of a predetermined format. Similarly, sound data and system information are subjected to decode processing by a sound decode unit (not shown) and a system information decode unit (not shown) respectively to generate a sound signal in a predetermined format.

(Configuration Processing Unit 206)

The configuration processing unit 206 cuts out a video region of the window A and that of the window B described above from the decoded video data. As shown in FIG. 2, the configuration processing unit 206 mainly includes a first video region cutout unit 212 that cuts out the window A and a second video region cutout unit 214 that cuts out the window B.

The first video region cutout unit 212 can decide, for example, a video region of the window A based on resolution that the monitor 500 can display or a region preset by the user as a video region of the window A. Here, video of the actually cutout window A is displayed in the monitor 500 and thus, if the resolution of the cutout window A and that of the monitor 500 do not match, it is necessary to perform scaling processing. If the resolution that the monitor 500 can display is 2 k×1 k and the whole region of 8 k×4 k video data received by the tuner unit 202 is cut out as the window A, it is necessary to scale down the video region so as to display the whole region of the video in the monitor 500. If, on the other hand, a portion of video region narrower than 2 k×1 k is cut out from 8 k×4 k video data received by the tuner unit 202 as the window A, it is necessary to scale up the video region so as to display the whole region of the video in the monitor 500. Therefore, the first video region cutout unit 212 performs scaling processing on video data of the cutout window A based on the resolution that the monitor 500 can display.

If the service system 200 is provided in an apparatus independent of the monitor 500, the service system 200 can be connected to a display apparatus having the monitor 500 via an interface conforming to, for example, the Digital Visual Interface (DVI) or High Definition Multimedia Interface (HDMI) standard. Therefore, the first video region cutout unit 212 can recognize the screen size of the monitor 500 by automatically acquiring Extended Display Identification Data (EDID) from a display apparatus having the monitor 500 or the like via Display Data Channel (DDC). If the service system 200 is connected to a display apparatus having the monitor 500 via an interface through which it is difficult to automatically acquire EDID, the first video region cutout unit 212 may store the screen size of the monitor 500 in advance.

The second video region cutout unit 214 cuts out only a predetermined region containing a specific object specified by the user from a video region displayed in the monitor 500 based on video data received, for example, via the tuner unit 202 as the window B. The user can specify any object from video displayed in the monitor 500 by, for example, a pointing device. Note that the object is a predetermined object on which the user focuses attention such as a specific player, ball, and uniform number in sports broadcasting and is not limited to a specific object. The second video region cutout unit 214 cuts out a video region containing a specific object specified by the user in this manner from 8 k×4 k video data received via the tuner unit 202 as the window B. If, for example, a predetermined object in 8 k×4 k video data moves, the second video region cutout unit 214 can cut out a video region containing the object as the window B by tracing the object.

Cutout of the window B and a trace method of a predetermined object carried out by the second video region cutout unit 214 can be realized by using general filtering processing, segmentation processing or the like.

When the window B being cut out, the second video region cutout unit 214 detects the relative position of the window B with respect to the window A cut out by the first video region cutout unit 212 described above as vector information. The second video region cutout unit 214 can generate vector information with a horizontal component and a vertical component in pixels by setting a predetermined position (for example, a vertex at the upper left corner of the screen) of the window A as the origin thereof. Vector information can also be generated with a horizontal component and a vertical component in pixels compared with a predetermined position of the window B (for example, the vertex at the upper left corner of the region of the window B) cut out last time. Based on vector information generated in this manner, the large-screen system 400 described later can cause the monitor 500 to display video of the window A after video of the window B being correctly superimposed thereon.

The configuration processing unit 206 allocates an ID to each piece of video data of the cutout window A and window B. Video data of the windows A and B to which an ID is allocated contains the above vector information together with timing information such as PCR (Program Clock Reference) and Timestamp and a frame counter from the start of video. The configuration processing unit 206 groups each piece of video data of the windows A and B to form the video data into a predetermined format or to encode the video data to a permissible rate before the video data being transmitted to the transmission unit 208.

(Transmission Unit 208)

The transmission unit 208 packetizes video data of the windows A and B and establishes a session necessary to start streaming between a first client system 320 and a second client system 340. After a session being established, the transmission unit 208 transmits video data of the window A to the first client system 320 and that of the window B to the second client system 340.

As described above, the service system 200 and the client system 300 may be provided in the same video display apparatus. In such a case, the service system 200 can cause a storage unit 304 of the client system 300 to directly store video data of the windows A and B without packetization.

(4. Function Configuration of the Client System 300)

Figure 3:
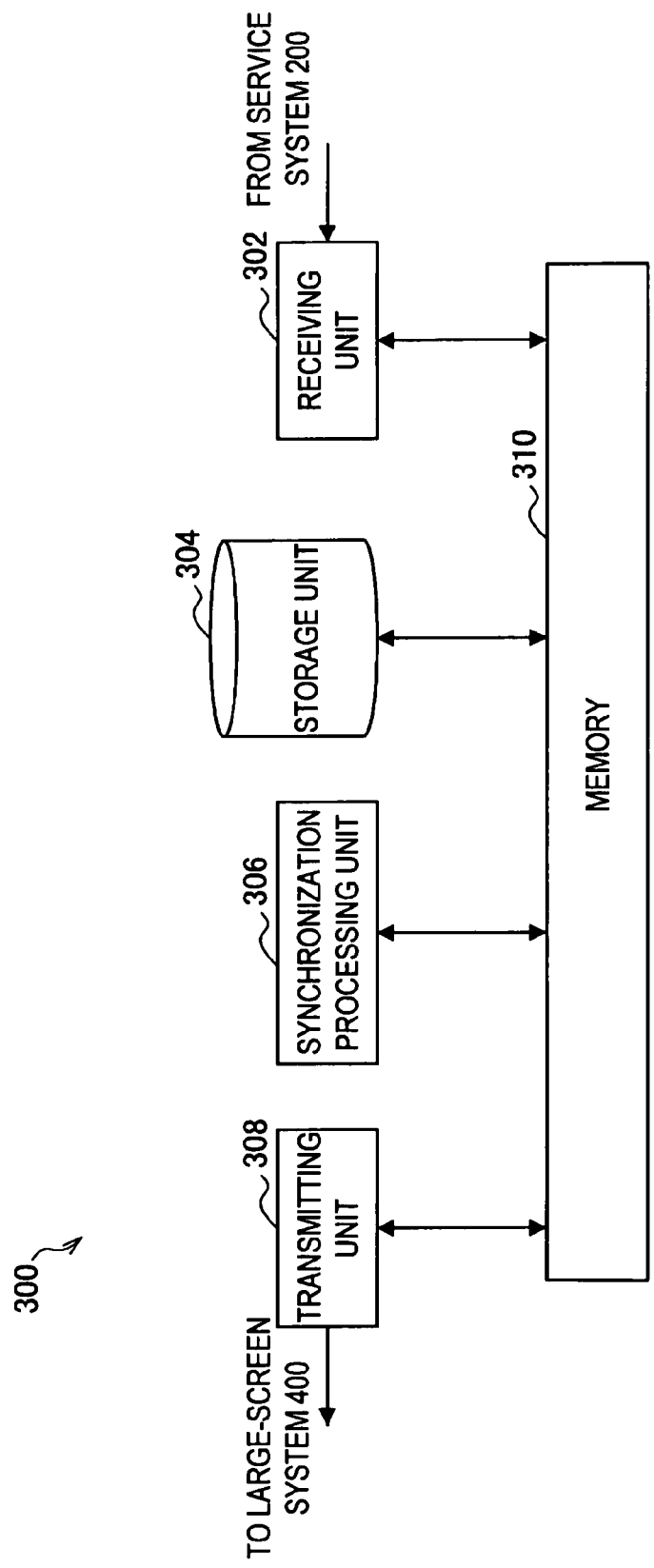
FIG. 3 is an explanatory view exemplifying the function configuration of a client system 300 in the embodiment.

Next, details of the function configuration of the client system 300 will be described below with reference to FIG. 3. FIG. 3 is an explanatory view exemplifying the function configuration of the client system 300.

As shown in FIG. 3, the client system 300 mainly includes a receiving unit 302, a storage unit 304, a synchronization processing unit 306, and a transmission unit 308. A memory 310 is a region to temporarily store data or a signal processed by these constituent units. These constituent units are linked by a bus or the like and integrally controlled by a CPU (not shown). Details of the function configuration of the client system 300 will be described below.

In the system example shown in FIG. 1, the client system 300 includes the first client system 320 and the second client system 340, but each of the systems is the client system 300 having the same function configuration and thus, the description will not be repeated. In the present embodiment, the first client system 320 manages video data corresponding to the window A transmitted from the service system 200 and the second client system 340 manages video data corresponding to the window B transmitted from the service system 200.

(Receiving Unit 302)

The receiving unit 302 establishes a session necessary to start streaming with the service system 200 and receives video data transmitted from the service system 200. In the video display system 100 according to the present embodiment shown in FIG. 1, the first client system 320 receives video data corresponding to the window A from the service system 200 and the second client system 340 receives video data corresponding to the window B from the service system 200.

(Storage Unit 304)

The storage unit 304 is a storage region to save video data received by the receiving unit 302. That is, in the video display system 100 shown in FIG. 1, the first client system 320 accumulates video data of the window A in the storage unit 304 and the second client system 340 accumulates video data of the window B in the storage unit 304. As described above, video data of the window B contains vector information together with the frame counter from the start of video and the like.

(Synchronization Processing Unit 306)

The synchronization processing unit 306 controls timing to transmit video signal to the large-screen system 400 described below based on timing information such as PCR and Timestamp which are included in video data saved in the storage unit 304 and the frame counter from the start of video. This is because, as described above, it is necessary for the first client system 320 and the second client system 340 to transmit image data corresponding to the window A cut out from 8 k×4 k image data and image data corresponding to the window B respectively in the same timing to the large-screen system 400.

(Transmission Unit 308)

The transmission unit 308 packetizes, of video data accumulated in the storage unit 304, video data decided by the synchronization processing unit 306 and establishes a session necessary to start streaming with the large-screen system 400. After a session being established, the transmission unit 308 transmits video data to the large-screen system 400. In the video display system 100 according to the present embodiment shown in FIG. 1, the first client system 320 transmits video data corresponding to the window A accumulated in the storage unit 304 and the second client system 340 transmits video data corresponding to the window B accumulated in the storage unit 304.

As described above, the service system 200 and the client system 300 may be provided in the same video display apparatus. In such a case, the service system 200 may cause the storage unit 304 to directly store video data without the client system 300 being provided with the receiving unit 302. In the video display system 100 shown in FIG. 1, the client system 300 includes the first client system 320 that manages video data corresponding to the window A and the second client system 340 that manages video data corresponding to the window B, but the present invention is not limited to this. For example, only one client system 300 may be configured by two storage units for storing video data of the windows A and B being provided.

(5. Function Configuration of the Large-Screen System 400)

Figure 4:
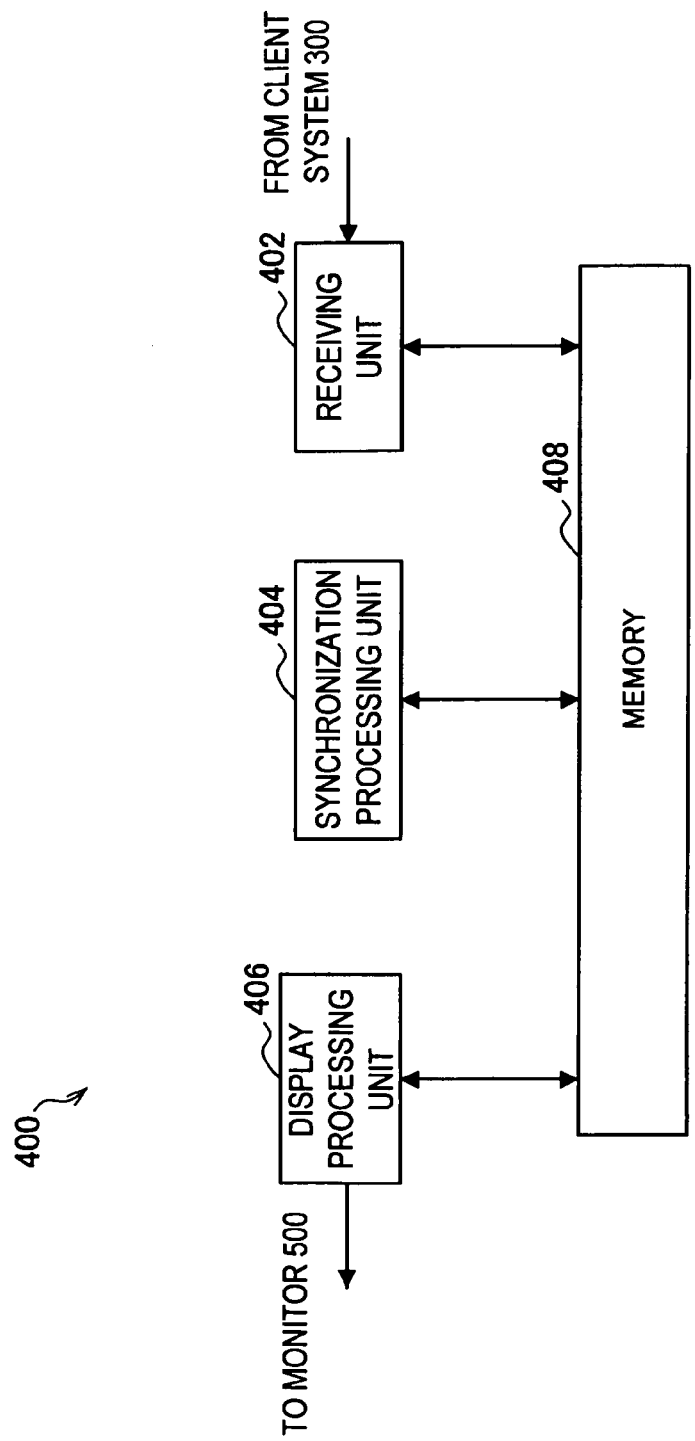
FIG. 4 is an explanatory view exemplifying the function configuration of a large-screen system 400 in the embodiment.

Next, details of the function configuration of the large-screen system 400 will be described with reference to FIG. 4. FIG. 4 is an explanatory view exemplifying the function configuration of the large-screen system 400.

As shown in FIG. 4, the large-screen system 400 mainly includes a receiving unit 402, a composition processing unit 404, and a display processing unit 406. A memory 408 is a region to temporarily store data or a signal processed by these constituent units. These constituent units are linked by a bus or the like and integrally controlled by a CPU (not shown). Details of the function configuration of the large-screen system 400 will be described below.

(Receiving Unit 402)

The receiving unit 402 establishes a session necessary to start streaming with the client system 300 and receives video data transmitted from the client system 300. In the video display system 100 according to the present embodiment shown in FIG. 1, the receiving unit 402 receives video data corresponding to the window A from the first client system 320 and that corresponding to the window B from the second client system 340. As described above, video data corresponding to the windows A and B cut out from the same 8 k×4 k video data is transmitted from the first client system 320 and the second client system 340 in synchronization respectively.

(Composition Processing Unit 404)

The composition processing unit 404 generates one piece of video data by synthesizing video data corresponding to the window A received by the receiving unit 402 and that corresponding to the window B. As described above, two pieces of video data received by the receiving unit 402 are transmitted after being synchronized by the client system 300 and thus, the composition processing unit 404 can generate one piece of video data by synthesizing these pieces of video data. As described above, while video data corresponding to the window A is scaled by the service system 200 in accordance with the resolution that can be displayed by the monitor 500, video data of the window B is in a state in which 8 k×4 k video quality is maintained. Therefore, the composition processing unit 404 can generate composite video data for video of the window B in a state in which high quality received by the service system 200 from a broadcasting station is maintained. As described above, video data of the window B contains vector information to determine the relative position with respect to the window A. Therefore, the composition processing unit 404 can correctly recognize the position of a video region of the window B in a video region of the window A. As a result, the composition processing unit 404 can determine the position of the window B in a video region of the window A based on the vector information and generate one piece of display image data in which both pieces of image data are synthesized by superimposing video data of the window B at the determined position.

(Display Processing Unit 406)

The display processing unit 406 converts video data synthesized by the composition processing unit 404 into a format to display the video data in the monitor 500 connected to the large-screen system 400. Note that the display processing unit 406 can convert the format of video data when necessary in accordance with the type and settings of the connected monitor 500 and the format of video data is not limited to a specific one.

Video data generated via the service system 200, the client system 300, and the large-screen system 400 in this manner will be displayed in the monitor 500. That is, by using a video display system according to the present embodiment, a video display apparatus including the monitor 500 can cause the monitor 500 to display a predetermined region (window B) containing a specific object specified by the user in a state of high quality received from a broadcasting station even if the monitor 500 supports the resolution of, for example, 2 k×1 k. A similar effect can also be achieved when a video display apparatus itself like a TV set has all functions of the service system 200, the client system 300, and the large-screen system 400 described above. That is, even if a video signal of resolution higher than the resolution compatible with such a video display apparatus is received, the video quality of high resolution can be maintained and displayed by the video display apparatus.

(6. Display Example of the Monitor 500)

Figure 5:
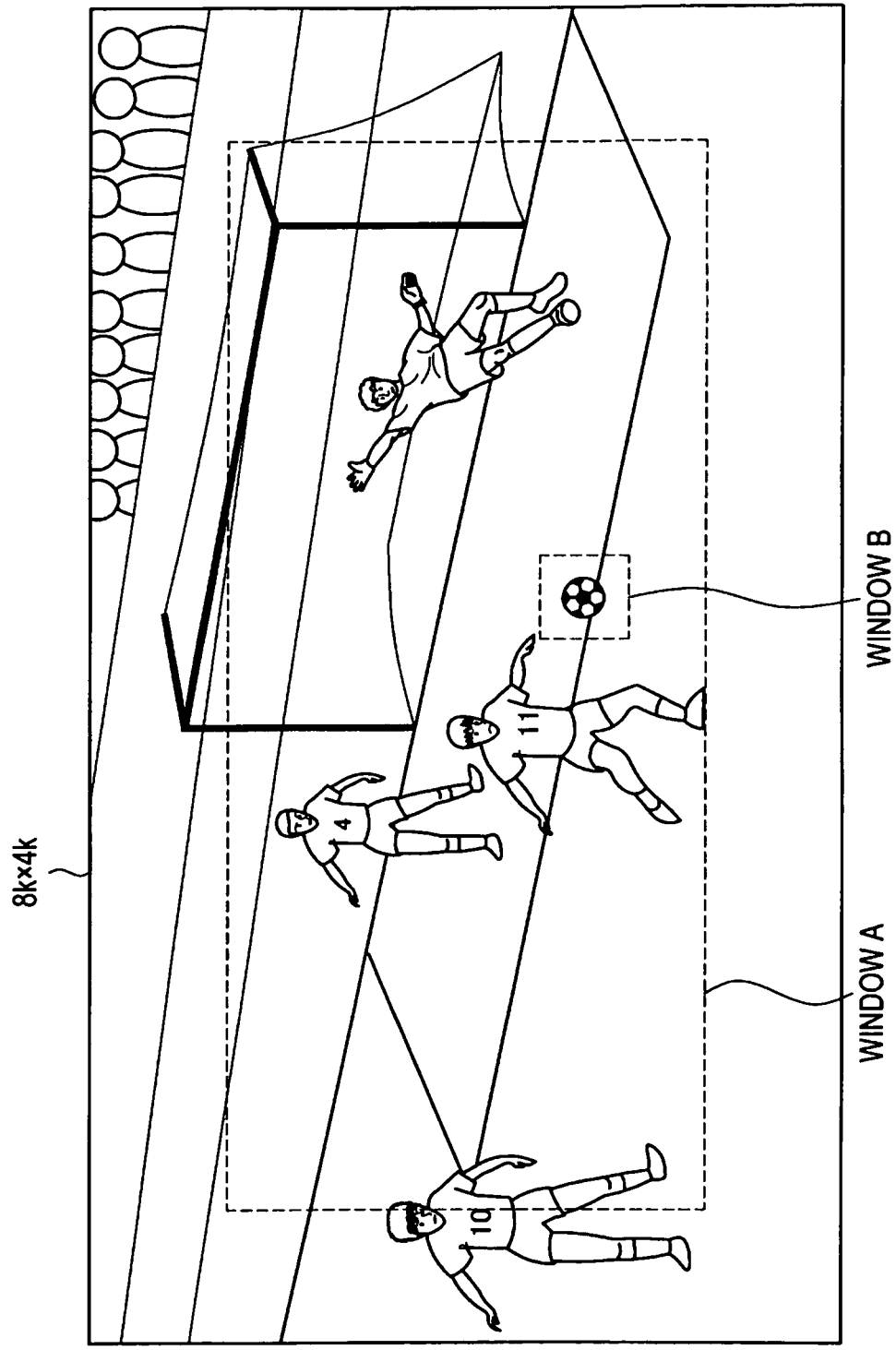
FIG. 5 is a conceptual diagram showing high-quality video data, a video region of a window A, and that of a window B in the embodiment.

Next, display examples of the monitor 500 when the video display system 100 configured as described above is used will be described. FIG. 5 is a conceptual diagram showing 8 k×4 k video received from a broadcasting station, a video region of the window A cut out from the video, and a video region of the window B containing an object specified by the user.

In the example shown in FIG. 5, the tuner unit 202 of the service system 200 receives video of high resolution of 8 k×4 k sent out from a broadcasting station. In this case, the first video region cutout unit 212 of the service system 200 cuts out a video region of the predetermined window A from the 8 k×4 k video region. The region of the window A may be, for example, preset based on the resolution of the monitor 500 or the user may preset a region of an arbitrary range. Therefore, the first video region cutout unit 212 can cut out a preset region from 8 k×4 k received video as the window A. Then, as described above, scaling processing is performed on the video data in the window A in accordance with display performance of the monitor 500. That is, if a video region of the window A cut out by the first video region cutout unit 212 is larger than the resolution that can be displayed by the monitor 500, the video data of the window A is scaled down in accordance with the resolution that can be displayed by the monitor 500. On the other hand, if a video region of the window A cut out by the first video region cutout unit 212 is smaller than the resolution that can be displayed by the monitor 500, the video data of the window A is scaled up in accordance with the resolution that can be displayed by the monitor 500.

As described above, the second video region cutout unit 214 of the service system 200 can cut out a video region of the window B containing an object specified by the user from 8 k×4 k video data received from a broadcasting station. In the example in FIG. 5, the user specifies a soccer ball displayed in the monitor 500 using, for example, a pointing device. Therefore, the second video region cutout unit 214 cuts out a predetermined region containing the soccer ball from the 8 k×4 k video region as the window B. The size of the video region cut out as the window B can be set arbitrarily by initialization or a user's operation.

Figure 6:
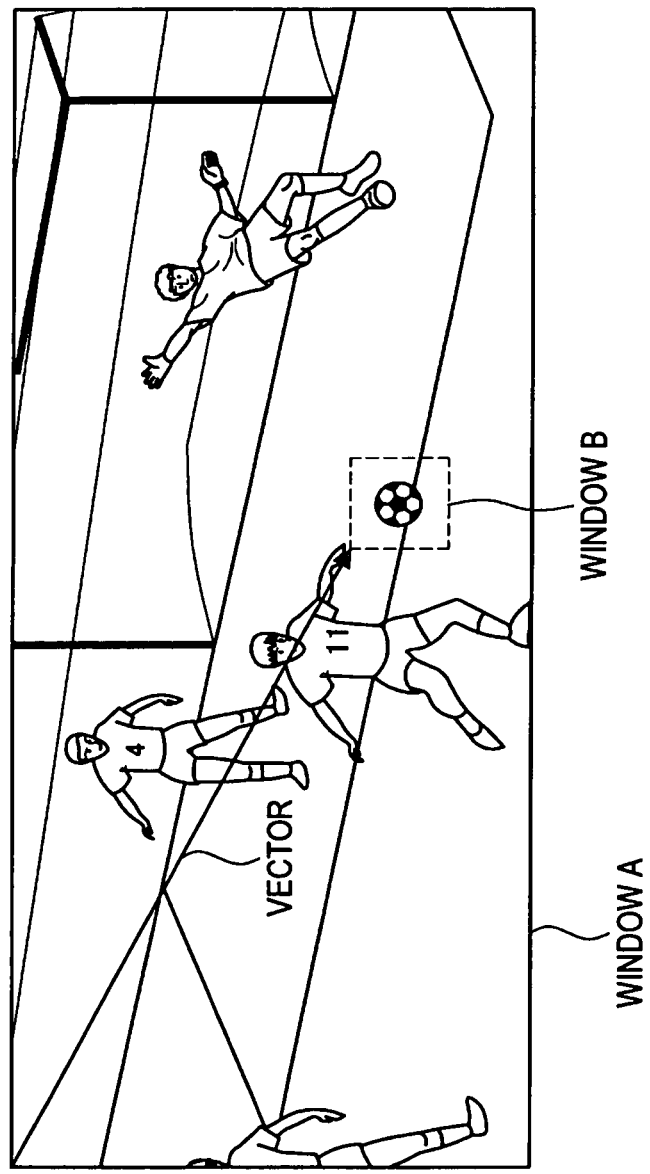
FIG. 6 is an explanatory view showing a display example in a monitor 500 of video data in which the windows A and B are superimposed in the embodiment.

Video data of the window A and that of the window B cut out in this manner are, as described above, stored in the storage unit 304 of the client system 300 and then, transmitted to the large-screen system 400 in synchronization. Subsequently, video data of the window B is superimposed on that of the window A by the composition processing unit 404 of the large-screen system 400 before the vide data is displayed in the monitor 500. FIG. 6 is an explanatory view showing a display example in the monitor 500 when video regions of the windows A and B shown in FIG. 5 are cut out.

It is known that, as shown in FIG. 6, that only the video region of the window A is displayed in the actual monitor 500. Therefore, a region of 8 k×4 k video data received from a broadcasting station that is not contained in the video region of the window A is not displayed in the monitor 500. As described above, scaling processing may be performed on the video region of the window A based on the resolution compatible with the monitor 500. Therefore, it is difficult for the video region of the window A to maintain a state of high quality received from the broadcasting station. Here, of video displayed in the monitor 500, a predetermined region containing the soccer ball is displayed, as described above, with video data of the window B cut out by the second video region cutout unit 214 being superimposed thereon. As described above, the video data of the window B is displayed in the monitor 500 without scaling processing being performed thereon. Therefore, the monitor 500 can be caused to display the video data of the window B while maintaining a state of high quality received from a broadcasting station. That is, by using the video display system 100 according to the present embodiment, the monitor 500 can be caused to display a predetermined region containing an object on which the user focuses attention in a state in which high quality is maintained even if video data of high quality incompatible with the monitor 500 is received. As a result, even if the monitor 500 is not compatible with, for example, an 8 k×4 k video display, a viewer can view video of high quality in a predetermined region containing an object on which the viewer focuses attention.

Figure 7:
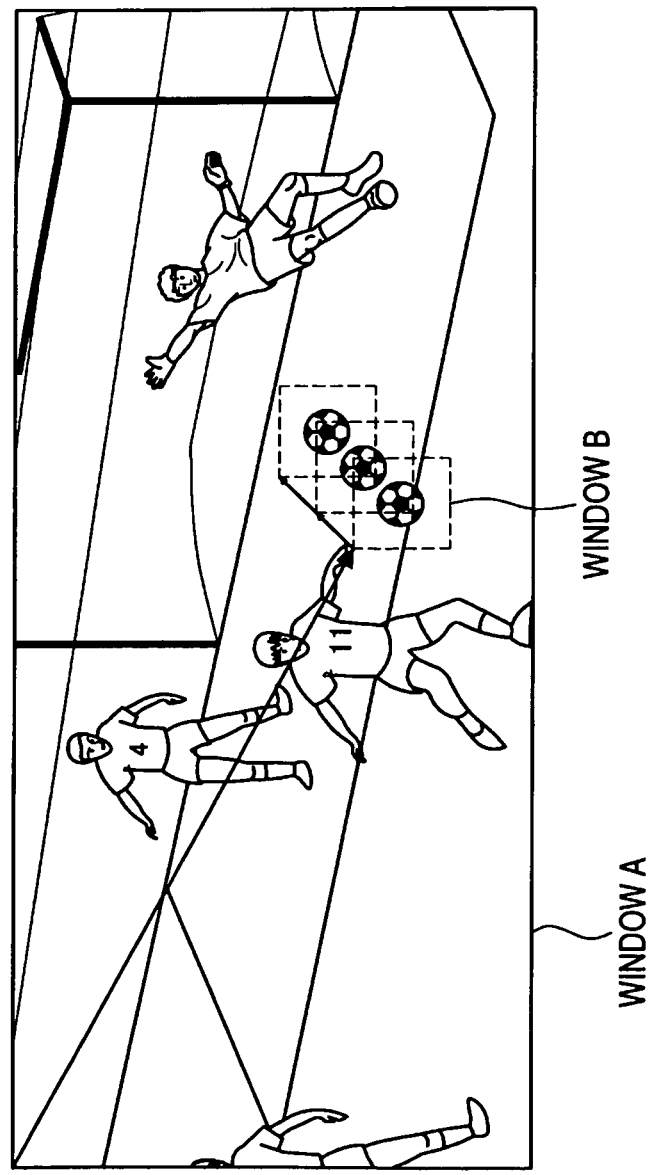
FIG. 7 is an explanatory view showing a concept of transition of a video region of the window B in the embodiment.

The position of an object specified by the user in an 8 k×4 k video region received from a broadcasting station constantly changes. If, for example, the user specifies a soccer ball like the above example, the position of the soccer ball in the 8 k×4 k video region changes with time as shown in FIG. 7. Also in such a case, as described above, the second video region cutout unit 214 can trace the position of the soccer ball and add vector information to video data when a video region of the window B is cut out. Therefore, based on the vector information, the composition processing unit 404 of the large-screen system 400 may generate one piece of video data by correctly superimposing video data of the window B on that of the window A.

As described in the foregoing, the service system 200 of the video display system 100 according to the present invention can cut out a preset region from a video signal of high resolution received from a broadcasting station as the window A. Further, the service system 200 can perform scaling processing on the cutout region data of the window A based on the resolution that can be displayed by the monitor 500. The service system 200 can also cut out a region containing a specific object specified by the user from a video signal of high resolution received from a broadcasting station as the window B. Further, the service system 200 can add the position of the window B in the video region of the window A to video data of the window B as vector information when the window B is cut out. The client system 300 manages video data of the windows A and B by accumulating the video data and synchronizes two pieces of video data before being transmitted to the large-screen system 400. After receiving two pieces of video data, the large-screen system 400 can generate one piece of video data by synthesizing two pieces of video data based on vector information added to video data of the window B and the like. As a result, video data obtained by superimposing video data of the window B in a state in which quality of high resolution is maintained on that of the window A on which scaling processing is performed is displayed in the monitor 500. That is, by using the video display system 100 according to the present embodiment, video quality of high resolution can be maintained and displayed even if a video signal of resolution higher than the resolution that can be displayed by the monitor 500 is received.

(7. Modification)

In the above embodiment, a case in which there is one monitor 500 is described, but the present invention is not limited to this. For example, a plurality of the monitors 500 can be caused to display 8 k×4 k video received from a broadcasting station by providing a plurality of the client systems 300, the large-screen systems 400, and the monitors 500.

Figure 8:
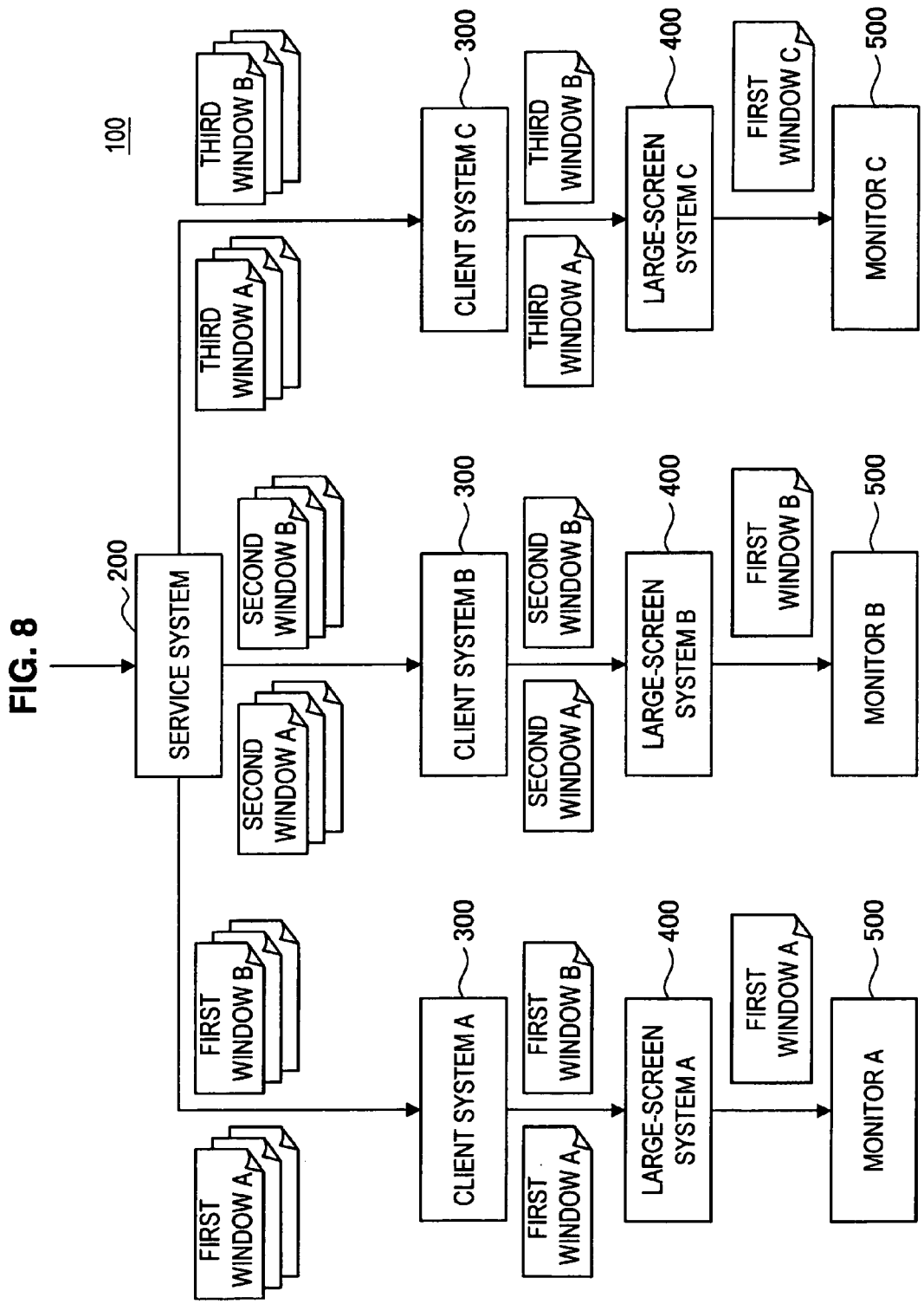
FIG. 8 is an explanatory view exemplifying the overall configuration of a video display system according to a modification of the embodiment.

FIG. 8 is an explanatory view exemplifying the overall configuration of a system of such a modification. In the example shown in FIG. 8, the video display system 100 includes three monitors 500. In the video display system 100, the client system 300 and the large-screen system 400 corresponding to each of the monitors 500. Also, each of client systems A, B, and C includes the first client system 320 and the second client system 340 described in the above embodiment. Thus, by providing the plurality of the monitors 500, each of monitors A, B, and C can be caused to display video of high resolution received from a broadcasting station by splitting the video among the monitors in the service system 200.

For example, the first video region cutout unit 212 of the service system 200 can cut out a video region that the monitor A is caused to display as a first window A, a video region that the monitor B is caused to display as a second window A, and a video that region the monitor C is caused to display as a third window A. That is, by splitting video of high resolution received from a broadcasting station into a plurality of regions, each monitor can be caused to display the video in a state in which quality of high resolution is maintained as much as possible. The windows A each monitor is caused to display may be preset based on resolution that each of the monitors 500 can display or arbitrary regions may be preset by the user as the windows A.

The second video region cutout unit 214 of the service system 200 determines and cuts out a region containing an object specified by the user from video of high resolution received from a broadcasting station. If, at this point, the cutout region is within a video region of the first window A the monitor A is caused to display, the cutout region is transmitted to the client system A as video data of a first window B. If the cutout region is within a video region of the second window A the monitor B is caused to display, the cutout region is transmitted to the client system B as video data of a second window B. Further, if the cutout region is within a video region of the third window A the monitor C is caused to display, the cutout region is transmitted to the client system C as video data of a third window B. If the cutout region extends over regions of a plurality of windows A, the service system 200 may generate video data of a plurality of windows B and transmit the video data to a plurality of client systems.

Subsequently, video data of the window B is superimposed on that of the window A in each of the large-screen systems A, B, and C to generate one piece of composite video data. If there is no video data of the window B, each of the large-screen systems A, B, and C can cause each of the monitors A, B, and C to display only video data of the window A as composite video. As a result, each of the monitors A, B, and C can display generated composite video data.

FIG. 9 is an explanatory view exemplifying video displayed in the three monitors A, B, and C by using the video display system 100 according to the modification. In the example shown in FIG. 9, the service system 200 receives video of high resolution of 8 k×4 k from a broadcasting station. In this case, the first video region cutout unit 212 of the service system 200 cuts out the video as video regions of the first window A for the preset monitor A, the second window A for the preset monitor B, and the third window A for the preset monitor C. The first video region cutout unit 212 also performs scaling processing on video data of each window A in accordance with the resolution that can be displayed by each monitor.

Further, FIG. 9 shows that the soccer ball specified by the user is contained in a video region of the second window A displayed in the monitor B. Therefore, the second video region cutout unit 214 of the service system 200 cuts out a predetermined region containing the soccer ball as the second window B and transmits the predetermined region to the client system B. Then, the large-screen system B generates a piece of composite video by superimposing video of the second window B containing the soccer ball on that of the second window A on which scaling processing is performed. After the composite video being generated, the monitor B can display the composite video. That is, of the video displayed in the monitor B, video that maintains quality of high resolution of 8 k×4 k will be displayed in the predetermined region containing the soccer ball.

Thus, a video display system according to the present embodiment, a plurality of monitors can be caused to display video of high resolution received from a broadcasting station by splitting the video. In this case, a video region of the window A cut out by the first video region cutout unit 212 can be set narrower compared with a case in which one monitor 500 is used. That is, distortion of video due to scaling of video of the window A can be minimized. As a result, the whole received video of high resolution can be split and displayed in a plurality of monitors without video quality being degraded as much as possible. Also in this case, one of a plurality of monitors can be caused to display at least a predetermined region containing a specific object specified by the user in a state in which received video quality of high resolution is maintained.

An example of three monitors is taken in the above description of the modification, but the present invention is not limited this example and two or four or more monitors may be caused to display video according to a similar manner. In the example shown in FIG. 8, each of the client systems A, B, and C and each of the large-screen systems A, B, and C are described as separate components, but the present invention is not limited to this. For example, one information processing apparatus may be provided with each function of the service system 200, each of the client systems A, B, and C and each of the large-screen systems A, B, and C. In this case, the above features can be realized by connecting three monitors A, B, and C to the information processing apparatus.

It should be understood by those skilled in the art that various modifications, combinations, sub-combinations and alterations may occur depending on design requirements and other factors insofar as they are within the scope of the appended claims or the equivalents thereof.

In the above embodiment, for example, a video display system provided with the service system 200, the client system 300, the large-screen system 400, and the monitor 500 is described, but these components can be realized by the same video display apparatus. In this case, the video display apparatus can realize the features of the above embodiment by being provided with each function of the service system 200, the client system 300, the large-screen system 400, and the monitor 500. In addition, it is naturally possible to provide individual and independent information processing apparatuses with only a portion of each of these systems.

Display examples of the monitor 500, cutout ranges of the windows A and B, the resolution of 8 k×4 k described above are only examples to describe the above embodiments and the present invention is not limited to these. That is, other resolutions and window cutout methods than those disclosed in the above description may be used. Display examples of the monitor 500 shown in each drawing are only examples to describe the above embodiments and the present invention is not limited to these examples.

What is claimed is:

1. A video display apparatus, comprising:
 a tuner unit that receives a video signal from a broadcasting station;
 a first video region cutout unit that cuts out video of a predetermined region set in advance from video received by the tuner unit as a window A and performs scaling processing on the video of the cutout window A;
 a second video region cutout unit that cuts out video of a predetermined region containing an object specified by a user from the video received by the tuner unit as a window B;
 a composition processing unit that generates video data by superimposing the video of the window B on that of the window A on which the scaling processing is performed; and
 at least one monitor that displays the video data generated by the composition processing unit,
 wherein the second video region cutout unit adds a position of the window B with respect to a video region of the window A to the video data of the window B as vector information, the vector information indicating the position of window B relative to window A by one of (i) specifying the position of window B relative to a predetermined point within window A, and (ii) specifying the position of window B relative to a prior position of window B.

2. The video display apparatus according to claim 1, wherein the composition processing unit generates the video data by superimposing the video of the window B on that of the window A on which the scaling processing is performed by determining the position of the window B with respect in the video region of the window A based on the vector information added to the video data of the window B.

3. The video display apparatus according to claim 2, wherein the first video region cutout unit performs the scaling processing on the video of the window A based on resolution that the monitor can display.

4. The video display apparatus according to claim 3, wherein if the resolution of the window A is larger than that the monitor can display, the first video region cutout unit scales down the video of the window A in accordance with the resolution that can be displayed by the monitor, and
 if the resolution of the window A is smaller than that the monitor can display, the first video region cutout unit scales up the video of the window A in accordance with the resolution that can be displayed by the monitor.

5. The video display apparatus according to claim 4, wherein
 if a plurality of the monitors is provided,
 the first video region cutout unit cuts out video of a predetermined region preset for each monitor from the video received by the tuner unit as a window A and performs the scaling processing on the cutout video of each window A based on the resolution that can be displayed by each monitor,
 the second video region cutout unit cuts out the video of the predetermined region containing the object specified by the user from the video received by the tuner unit as the window B,
 the composition processing unit generates one piece of video data based on the video data of the windows A and B for each of the plurality of monitors, and
 the plurality of monitors display each piece of the video data generated by the composition processing unit.

6. A video display system, including:
 a service system comprising a tuner unit that receives a video signal from a broadcasting station, a first video region cutout unit that cuts out video of a predetermined region set in advance from video received by the tuner unit as a window A and performs scaling processing on the video of the cutout window A, and a second video region cutout unit that cuts out video of a predetermined region containing an object specified by a user from the video received by the tuner unit as a window B;

a client system that manages video data of the windows A and B cut out by the service system by synchronizing the video data;

a large-screen system comprising a composition processing unit that acquires the video data of the windows A and B managed by the client system in synchronization and generates video data by superimposing the video of the window B on that of the window A on which scaling processing is performed; and a video display apparatus comprising a monitor that displays the video data synthesized by the large-screen system, wherein the second video region cutout unit adds a position of the window B with respect to a video region of the window A to the video data of the window B as vector information, the vector information indicating the position of window B relative to window A by one of (i) specifying the position of window B relative to a predetermined point within window A, and (ii) specifying the position of window B relative to a prior position of window B.

7. A video display method, comprising the steps of:

receiving a video signal from a broadcasting station;

cutting out a window A by cutting out video of a predetermined region set in advance from video received in the receiving step as the window A;

performing scaling processing on the video of the cutout window A cut out in the step of cutting out the window A;

cutting out a window B by cutting out video of a predetermined region containing an object specified by a user from the video received in the receiving step as the window B;

adding a position of the window B with respect to a video region of the window A to the video data of the window B as vector information, the vector information indicating the position of window B relative to window A by one of (i) specifying the position of window B relative to a predetermined point within window A, and (ii) specifying the position of window B relative to a prior position of window B;

composition processing of generating video data by superimposing the video of the window B on that of the window A on which the scaling processing is performed; and causing at least one monitor to display the video data generated in the composition processing step.

* * * * *